United States Patent
Wang (10) Patent No.: US 10,723,041 B2
(45) Date of Patent: Jul. 28, 2020

(54) CORE DRILL BIT

(71) Applicants: SAINT-GOBAIN ABRASIVES, INC., Worcester, MA (US); SAINT-GOBAIN ABRASIFS, Conflans-Sainte-Honorine (FR)

(72) Inventor: Ji Wang, Shanghai (CN)

(73) Assignee: SAINT-GOBAIN ABRASIVES, INC./SAINT-GOBAIN ABRASIFS, Worcester, MA (US)

( * ) Notice: Subject to any disclaimer, the term of this patent is extended or adjusted under 35 U.S.C. 154(b) by 71 days.

(21) Appl. No.: 15/796,372

(22) Filed: Oct. 27, 2017

(65) Prior Publication Data

US 2018/0117793 A1 May 3, 2018

Related U.S. Application Data

(60) Provisional application No. 62/420,288, filed on Nov. 10, 2016.

(30) Foreign Application Priority Data

Oct. 28, 2016 (CN) .......................... 2016 1 0971259

(51) Int. Cl.
*E21B 10/48* (2006.01)
*B28D 1/14* (2006.01)
(Continued)

(52) U.S. Cl.
CPC .......... *B28D 1/146* (2013.01); *B23B 51/0406* (2013.01); *B28D 1/041* (2013.01);
(Continued)

(58) Field of Classification Search
CPC combination set(s) only.
See application file for complete search history.

(56) References Cited

U.S. PATENT DOCUMENTS 3,258,817 A * 7/1966 Smiley .................. B22F 1/0048
164/496
3,871,840 A * 3/1975 Wilder ..................... B24D 7/00
51/295
(Continued)

FOREIGN PATENT DOCUMENTS

CN 1640596 A 7/2005
CN 103748309 A 4/2014
(Continued)

OTHER PUBLICATIONS

International Search Report & Written Opinion dated Feb. 19, 2018, with regard to International Application No. PCT/US2017/058808, 12 pgs.
(Continued)

*Primary Examiner* — Taras P Bemko
*Assistant Examiner* — Ronald R Runyan
(74) *Attorney, Agent, or Firm* — Abel Schillinger, LLP; Joseph Sullivan (57) ABSTRACT

A core drill bit can include a first region and a second region. The first region can include abrasive particles in a first bond matrix, and the second region can include abrasive particles in a second bond matrix. The first region is connected to the second region. A composition of the first bond matrix can be different from a composition of the second matrix. In a particular embodiment, the first bond matric can include a Co-containing material.

19 Claims, 6 Drawing Sheets

(51) Int. Cl.
  B23B 51/04 (2006.01)
  B28D 1/04 (2006.01)
  E21B 10/02 (2006.01)
(52) U.S. Cl.
  CPC ....... *B23B 2222/21* (2013.01); *B23B 2222/44* (2013.01); *B23B 2228/12* (2013.01); *B23B 2251/122* (2013.01); *E21B 10/02* (2013.01); *E21B 10/48* (2013.01)

(56) References Cited

U.S. PATENT DOCUMENTS

| | | | |
|---|---|---|---|
| 4,483,108 A | | 11/1984 | Howard |
| 4,923,512 A | * | 5/1990 | Timm ............... B22F 3/156 419/15 |
| 5,092,920 A | * | 3/1992 | Nakai ............... B01J 3/062 501/87 |
| 5,868,125 A | | 2/1999 | Maoujoud |
| 5,900,207 A | | 5/1999 | Danforth et al. |
| 5,996,571 A | * | 12/1999 | Jedick ............... B28D 1/041 125/20 |
| 6,192,875 B1 | * | 2/2001 | Koroku ............... B28D 1/041 125/20 |
| 6,511,265 B1 | * | 1/2003 | Mirchandani ............ B22F 7/06 407/118 |
| 6,767,499 B1 | | 7/2004 | Hory et al. |
| 7,524,345 B2 | | 4/2009 | Nevoret et al. |
| 7,875,091 B2 | | 1/2011 | Nevoret et al. |
| 8,109,177 B2 | | 2/2012 | Kembaiyan |
| 8,308,830 B2 | | 11/2012 | Egan et al. |
| 2003/0150442 A1 | | 8/2003 | Boland et al. |
| 2004/0226405 A1 | | 11/2004 | Geving et al. |
| 2004/0244540 A1 | | 12/2004 | Oldham et al. |
| 2006/0185257 A1 | | 8/2006 | Nevoret et al. |
| 2006/0231293 A1 | | 10/2006 | Ladi et al. |
| 2010/0193254 A1 | * | 8/2010 | Lind ............... B22F 3/26 175/393 |
| 2010/0193255 A1 | | 8/2010 | Stevens et al. |
| 2010/0320005 A1 | * | 12/2010 | Burhan ............... B22F 7/06 175/426 |
| 2013/0316149 A1 | | 11/2013 | Atkins et al. |
| 2015/0008046 A1 | | 1/2015 | Cuillier De Maindreville et al. |
| 2015/0259986 A1 | * | 9/2015 | Stockey ............... E21B 10/55 175/434 |
| 2015/0290771 A1 | | 10/2015 | Li |
| 2015/0330154 A1 | * | 11/2015 | Pearce ............... E21B 10/62 175/425 |
| 2015/0375368 A1 | | 12/2015 | Gosamo |
| 2016/0271757 A1 | | 9/2016 | Kanyanta et al. |

FOREIGN PATENT DOCUMENTS

| | | |
|---|---|---|
| CN | 105563352 A | 5/2016 |
| CN | 105921793 A | 9/2016 |
| CN | 106926446 A | 7/2017 |
| CN | 106938335 A | 7/2017 |
| JP | H05-046404 U | 6/1993 |
| JP | 2006-187848 | 7/2006 |
| JP | 2010-527888 A | 8/2010 |
| JP | 2016-49579 A | 4/2016 |
| WO | 2010016959 A2 | 2/2010 |
| WO | 2015069849 A1 | 5/2015 |
| WO | 2016209696 A1 | 12/2016 |
| WO | 2016210057 A1 | 12/2016 |
| WO | 2017173009 A1 | 10/2017 |

OTHER PUBLICATIONS

International Search Report & Written Opinion for PCT/US2019/029239, dated Sep. 11, 2019, 12 pages.
Spierings, A.B. et al., "Processing of Metal-Diamond-Composites Using Selective Laser Melting," Review Paper, Institute for rapid product development, Inspire AG, St.Gallen, CH-9014, Switzerland, Empa, Swiss Federal Laboratories for Materials Science and Technology, Dübendorf, CH-8600, Switzerland, Institute of machine tools and manufacturing, ETH Zurich, CH-8092, Switzerland, SFF 2014, 11 pages.
ExOne Binder Jetting Technology, "What is Binder Jetting?", <https://www.exone.com/en-US/case-studies/what-is-binder-jetting>, retrieved Oct. 3, 2019, 2 pages.
Abrasive Technology—Current Development and Applications I, Proceedings of the Third International Conference on Abrasive Technology (ABTEC '99), Brisbane, Australia, Nov. 1999, 556 pages. (Abstract).
Beyer, Dr. Peter, "Exploring the New Dimensions of 3D Abrasives Technology," The Meister Toolbox, Jul. 7, 2016, 2 pages, <https://meister-abrasives-toolbox.com/2016/07/07/exploring-the-new-dimensions-of-3d-abrasives-technology/>.
Office Action dated Apr. 17, 2020 in corresponding Japanese Patent Application No. 2019-523558, with English translation.

* cited by examiner

CORE DRILL BIT

CROSS-REFERENCE TO RELATED APPLICATION(S)

This application claims priority to Chinese Patent Application No. 201610971259, filed Oct. 28, 2016, entitled "CORE DRILL BIT AND METHODS OF FORMING", by Ji WANG, which is assigned to the current assignee hereof and incorporated herein by reference in its entirety. This application further claims priority under 35 U.S.C. § 119(e) to U.S. Provisional Patent Application No. 62/420,288, filed Nov. 10, 2016, entitled "CORE DRILL BIT AND METHODS OF FORMING", by Ji WANG, which is assigned to the current assignee hereof and incorporated herein by reference in its entirety.

BACKGROUND OF THE INVENTION

Field of the Disclosure

The present invention relates, in general, to core drill bits and methods of forming.

Description of the Related Art

Core drill bits can be used to generate holes in materials. In applications of drilling brittle materials, such as glass, chipped areas are often formed around edges of drilled holes, due to lack of better control over formation of edges during drilling and nature of glass. Glass core drill bits are worn out quickly and often have reduced service life. The industry continues to demand improved core drill bits, particularly for applications of drilling brittle materials.

BRIEF DESCRIPTION OF THE DRAWINGS

The present disclosure may be better understood, and its numerous features and advantages made apparent to those skilled in the art by referencing the accompanying drawings.

DETAILED DESCRIPTION

The following is generally directed to core drill bits that are particularly suitable for cutting brittle materials, such as glass.

Embodiments are directed to a core drill bit having improved performance. The core drill bit can have a first region and a second region, both of which can include abrasive particles contained within a bond matrix. The first and second regions can be bonded abrasive materials including a continuous three-dimensional matrix of bond material and abrasive particles and other materials contained within the bond matrix. The first region and the second region can define a surface of the core drill bit that is in contact with a substrate in an operation of drilling. The first region and the second region can have different compositions, properties, or both. The first and second regions may facilitate reduced wear of the drill bit and improved edge quality of the workpiece. The core drill bit can be particular suitable for operations of drilling glass, such as automobile glass and flat glass, allowing better control over formation of edges and having improved service life.

Figure 1:
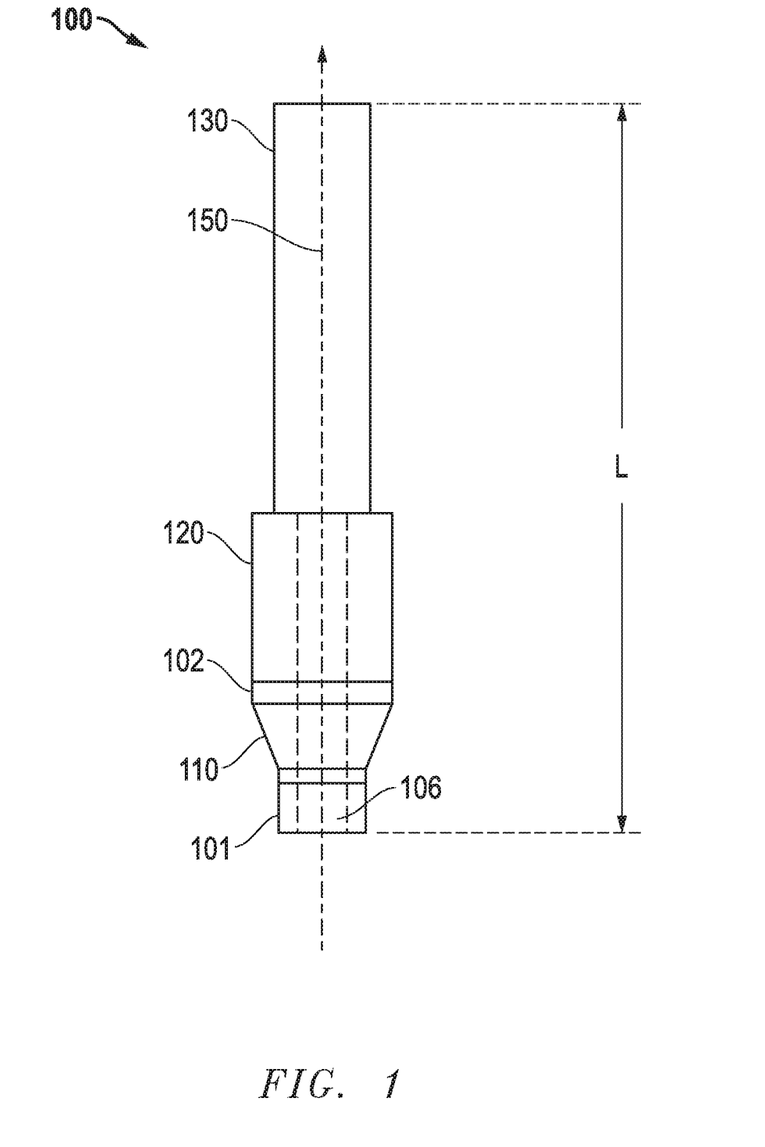
FIG. 1 includes an illustration of a side view of a drill bit in accordance with an embodiment.

FIG. 1 includes a side view of a core drill bit 100. The core drill bit can include a shaft 130. The shaft 130 can be connected to a drill body 120. The core drill bit can further include an abrasive tip 110, which can be connected to the drill body 120. The abrasive tip 110 can include a first region 101 and a second region 102.

In an embodiment, the first region 101 can include abrasive grains within a first bond matrix. The first bond matrix can include a material including particular composition that can facilitate improved formation, properties, and/or operation of the core drill bit. In an embodiment, the first bond matrix can include a metal element, a metal alloy, or a combination thereof. In a further embodiment, the first bond matrix can include at least one transition metal element. Particularly, the first bond matrix can include an alloy material including at least one transition metal element. For instance, the first region can include a material including Fe. In another instance, the first bond matrix can include Fe and an additional transition metal element. The additional transition metal element can include Co, Cu, Zn, Sn, or any combination thereof. In an instance, the first region can include Fe and Cu. In another example, the first bond matrix can include a material including Fe, Co and Cu. In still another instance, the first bond matrix can include Fe and an alloy, such as bronze or brass. In more particular instances, the first bond matrix can include a Co-containing material. The Co-containing material can include Co, Fe, Cu, or any combination thereof. Particularly, the Co-containing material can include an alloy including Co, Fe, and Cu. In some other instances, the first bond matrix can include a Co-containing material and an alloy, such as bronze or brass.

In another particular embodiment, the first bond matrix may include an impurity, such as C, Ca, Cl, Cr, Mn, Na, Si, or a combination thereof, and the total concentration of all the impurities may not be greater than 1%, such as not greater than 0.5% for the total weight of the first bond matrix. According to one aspect, the first bond matrix can consist essentially of Co, Fe, and Cu. As used herein, the term, consisting essentially of, is intended to mean not greater than 1% of impurities can be included other than the explicitly included components, which in the first bond matrix, are Co, Fe, and Cu.

In an embodiment, the first bond matrix can include a particular concentration of Co that can facilitate improved formation, properties, and/or operation of the core drill bit. For instance, the concentration of Co can be at least 5% for the total weight of the first bond matrix, such as at least 8%, at least 10%, at least 15%, at least 20%, at least 23%, at least 25%, at least 26%, or at least 27%. In another instance, the concentration of Co can be at most 40%, such as at most 38%, at most 32%, at most 31%, at most 29%, at most 28%, at most 27%, at most 25%, or most 20% for the total weight of the first bond matrix. It is to be understood that the concentration of Co in the first bond matrix can be within a range including any of the minimum and maximum percentages disclosed herein. For instance, the first bond matrix can include a concentration of Co within a range including at least 5% and not greater than 40%, such as within a range including at least 15% and not greater than 29%. In another embodiment, the first bond matrix may not include Co.

In an embodiment, the first bond matrix can include a particular concentration of Fe that can facilitate improved formation, properties, and/or operation of the core drill bit. For instance, the concentration of Fe can be at least 10% for the total weight of the first bond matrix, such as at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, or at least 90%. In another instance, the concentration of Fe can be at most 90%, at most 85%, at most 80%, at most 75%, at most 60%, at most 55%, at most 50%, at most 45%, at most 40%, at most 35%, or at most 30% for the total weight of the first bond matrix. It is to be understood that the concentration of Fe in the first bond matrix can be within a range including any of the minimum and maximum percentages disclosed herein. For instance, the first bond matrix can include a concentration of Fe within a range including at least 10% and not greater than 90%, such as within a range including at least 20% and not greater than 80%.

In an embodiment, the first bond matrix can include a particular concentration of Cu that can facilitate improved formation, properties, and/or operation of the core drill bit. For instance, the concentration of Cu can be at least 2% for the total weight of the first bond matrix, such as at least 5%, at least 8%, at least 10%, at least 12%, at least 15%, at least 20%, at least 25%, at least 30%, at least 35%, at least 40%, at least 45%, or at least 50%. In another instance, the concentration of Cu can be at most 60%, at most 55%, at most 50%, at most 45%, at most 40%, at most 35%, at most 30%, at most 25%, at most 20%, or at most 15% for the total weight of the bond matrix. It is to be understood that the concentration of Cu in the first bond matrix can be within a range including any of the minimum and maximum percentages disclosed herein. For instance, the first bond matrix can include a concentration of Cu within a range including at least 2% and not greater than 60%, such as within a range including at least 5% and not greater than 50%.

In an embodiment, the first region can include a particular concentration of the first bond matrix that can facilitate improved formation and properties of the core drill bit. For instance, the first bond matrix concentration can be at least 85% for a total weight of the first region, such as at least 88%, at least 90%, at least 95%, or at least 99%. In another embodiment, the first region can include a first bond matrix concentration of not greater than 99% for a total weight of the first region, such as not greater than 95% or not greater than 90%. It is to be understood that the first bond matrix concentration can be within a range including any of the minimum and maximum percentages noted herein. For instance, the first bond matrix concentration can be within a range including at least 85% and not greater than 99%.

In an embodiment, the first region can include abrasive particles including a superabrasive material. An exemplary superabrasive material can include diamond, cubic boron nitride (cBN), or any combination thereof. In a particular embodiment, the superabrasive material can consist of diamond, cubic boron nitride (cBN), or any combination thereof.

In an embodiment, the abrasive particles can have an average particle size of at least 30 microns, such as at least 35 microns, at least 40 microns, at least 45 microns, at least 50 microns, at least 55 microns, at least 60 microns, at least 70 microns, at least 80 microns, at least 85 microns, at least 95 microns, at least 100 microns, at least 125 microns, or at least 140 microns. In another embodiment, the abrasive particles can have an average particle size of at most 150 microns, such as at most 145 microns, at most 120 microns, at most 110 microns, at most 105 microns, at most 100 microns, at most 95 microns, at most 90 microns, at most 85 microns, at most 80 microns, at most 75 microns, at most 70 microns, at most 65 microns, at most 60 microns, at most 50 microns, at most 45 microns, at most 40 microns. It is to be appreciated that the abrasive particles in the first region can have an average particle size within a range including any of the minimum and maximum values disclosed herein. For instance, the average particle size of the abrasive particles within the first region can be within a range including at least 30 microns and at most 150 microns.

In an embodiment, the first region can include a particular abrasive particle concentration that can facilitate improved formation and properties of the core drill bit. For example, the first region can include an abrasive particle concentration of at least 1% for a total weight of the first region, such as at least 3%, at least 4%, at least 5%, at least 6%, at least 8%, or at least 10%. In a further embodiment, the first region can include an abrasive particle concentration of not greater than about 10% for a total weight of the first region, such as not greater than about 8%, not greater than about 5% or not greater than about 3%. It is to be understood that the first region can include an abrasive particle concentration within a range including any of the minimum and maximum percentages noted herein. For instance, the first region can include an abrasive particle concentration within a range including at least 1% and not greater than 10% for a total weight of the first region.

The first region may have a particular porosity that may facilitate improved formation, properties, and/or operation of the core drill bit. In an embodiment, the first region may have a porosity of not greater than 5 vol % for a total volume of the first region, such as not greater than 4 vol %, or not greater than 3 vol %. In another embodiment, the first region can have a porosity of at least 0.2 vol % for a total volume of the first region, such as at least 0.5 vol %, at least 0.8 vol %, at least 1 vol %, at least 1.5 vol %, or at least 2 vol % for a total volume of the first region. It is to be understood that the first region can include a porosity within a range including any of the minimum and maximum percentages disclosed herein. For instance the first region can have a porosity within a range including at least 0.2 vol % and not greater than 5 vol % for a total volume of the first region.

Figure 2:
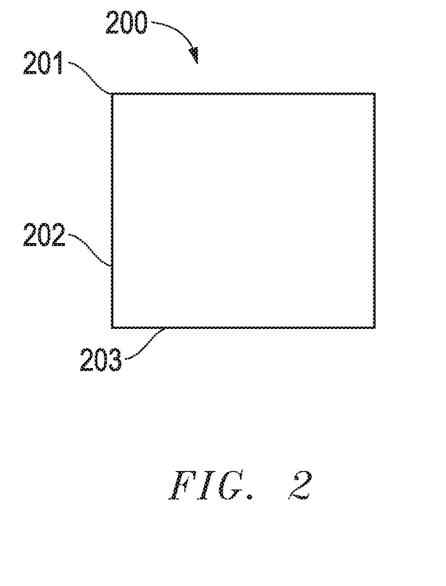
FIG. 2 includes an illustration of a side view of a region of a drill bit in accordance with an embodiment.
Figure 3:
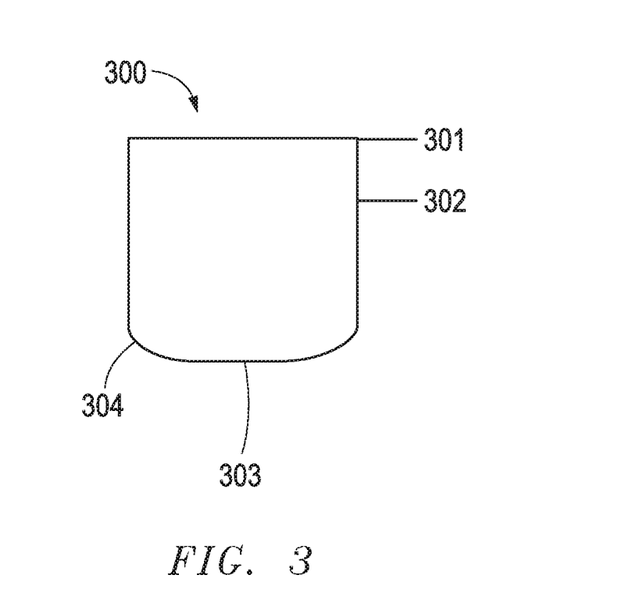
FIG. 3 includes an illustration of a side view of a region of a drill bit in accordance with another embodiment.
Figure 4:
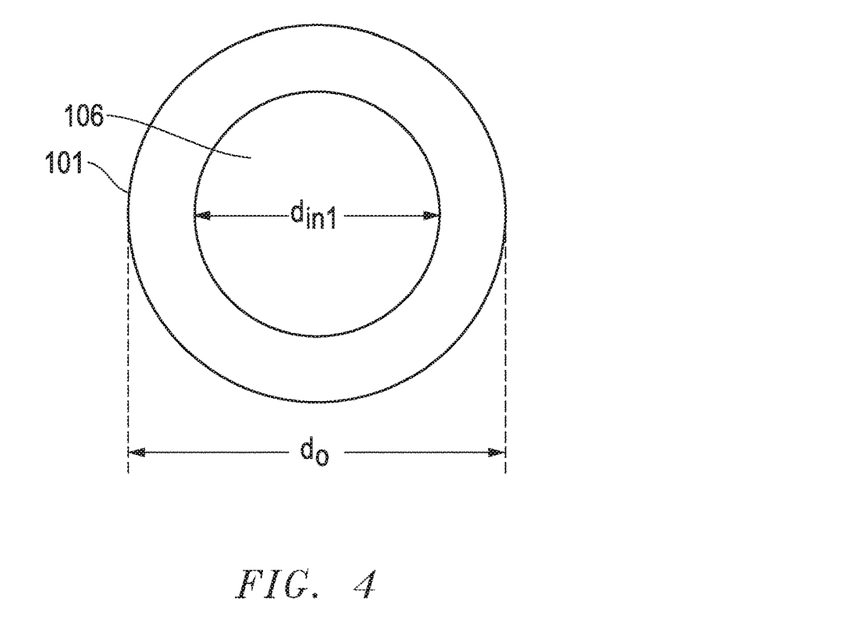
FIG. 4 includes an illustration of a cross-sectional view of a region of a drill bit in accordance with an embodiment.
Figure 5:
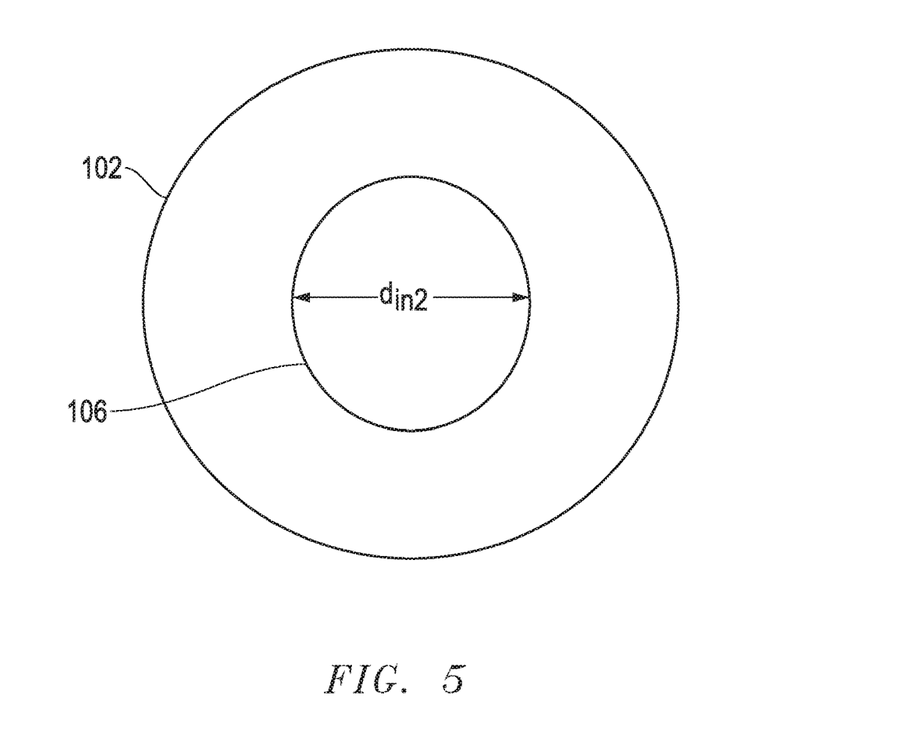
FIG. 5 includes an illustration of a cross-sectional view of a different region of a drill bit in accordance with an embodiment.

FIG. 2 includes an illustration of a side view of an exemplary embodiment of the first region. The first region 200 can include an upper end 201 that can be connected to the second region (e.g., 102). The peripheral wall 202 can be perpendicular to the upper end 201 and the bottom end 203 that is opposite the upper end. FIG. 3 includes a side view illustration of another embodiment of the first region. The first region 300 can include the upper end 301 that is similar to the upper end 201. The peripheral wall 302 can be perpendicular to the upper end 301 and connected to the bottom end 303 by a beveled edge 304. The bottom end 203 and 303 can be in direct contact with a workpiece in drilling operations. From the side view, the beveled edge can be linear or curvier. In some particular applications, the beveled edge can be a curve from the side view. Having a beveled edge at the tip of a core drill bit can help to reduce load of the drilling machine and improve core drill adaptation.

In another embodiment, the second region can include abrasive grains within a second bond matrix. The first bond matrix and the second bond matrix have a different composition, property, or both. In a particular embodiment, the second bond matrix can have a different composition as compared to the first region. The second bond matrix can include a material including a transitional element. The transitional element can include Co, Fe, Cu, Sn, or any combination thereof. In a particular embodiment, the second bond matrix can include Co, Sn, or a combination thereof. In another embodiment, the second bond material can include a Co-containing material. In one embodiment, the second bond matrix can include a Co-containing material and a transition metal element that is distinct from cobalt. In certain instances, the second bond matrix can include an alloy material including a combination of at least two of Co, Fe, Cu, and Sn. In a particular embodiment, the second bond matrix can consist essentially of Co and Sn.

In still another embodiment, the second bond matrix can include an impurity, such as C, Ca, Cl, Cr, Mn, Na, Si, Zn, O, or a combination thereof, and the total concentration of all the impurities may not be greater than 1%, such as not greater than 0.5%.

According to one aspect, the second bond material can include a particular concentration of Sn that can facilitate improved formation and properties of the core drill bit. For example, the concentration of Sn can be at least 1% Sn for a total weight of the second bond matrix, such as at least 1.2%, at least 1.5%, at least 2.5%, at least 3%, at least 3.5% or at least 4.5%. In another embodiment, the second bond matrix can include at most 10% of Sn for a total weight of the second bond matrix, such as at most 9%, at most 8.5%, at most 7.5%, at most 7%, at most 6.5%, at most 5.5%, at most 4.5%, at most 3.5%, or at most 3% of Sn for a total weight of the second bond matrix. It is to be understood that the concentration of Sn in the second bond matrix can be within a range including any of the minimum and maximum percentages disclosed herein. For instance, the second bond matrix can include Sn in a concentration within a range including at least 1% to not greater than 10%.

According to one aspect, the second bond material can include a particular concentration of Co that can facilitate improved formation and properties of the core drill bit. For example, the concentration of Co can be at least 60% Sn for a total weight of the second bond matrix, such as at least 90%, at least 95%, or at least 97%. In another embodiment, the second bond matrix can include at most 99% of Co for a total weight of the second bond matrix, such as at most 97%, at most 95%, at most 90%, at most 85%, at most 75%, at most 70%, or at most 65% of Co for a total weight of the second bond matrix. It is to be understood that the concentration of Co in the second bond matrix can be within a range including any of the minimum and maximum percentages disclosed herein. For instance, the second bond matrix can include Co in a concentration within a range including at least 60% to not greater than 99%.

In an embodiment, the second region can include a particular concentration of the second bond matrix that can facilitate improved formation, properties, and/or operation of the core drill bit. For instance, the second bond matrix concentration can be at least 75% for a total weight of the second region, such as at least 80%, at least 85% or at least 90%. In another embodiment, the second region can include a second bond matrix concentration of not greater than 99% for a total weight of the second region, such as not greater than 95%, not greater than 92%, or or not greater than 90%. In a further embodiment, the second bond matrix concentration may be different than or the same as the first bond matrix concentration. It is to be understood that the second bond matrix concentration can be within a range including any of the minimum and maximum percentages noted herein. For instance, the second bond matrix concentration can be within a range including at least 70% and not greater than 99%, such as within a range including at least 90% and at most 99%.

In an embodiment, the core drill bit can include an elemental weight percent difference between the composition of the first bond matrix and the second bond matrix. An elemental weight percent difference is the absolute value of the difference in weight concentration of each element contained in the first bond matrix relative to the second bond matrix. By way of example only, in an embodiment, a first bond matrix including 27% of Co, 66% of Fe, and 7% of Cu and a second bond matrix including 97% of Co, and 3% Sn, the elemental weight percent difference between the first region bond matrix composition and the second region bond matrix composition for Co is 70%, for Fe is 66%, for Cu is 7%, and for Sn is 3%. The maximum elemental weight percent difference between the composition of the first bond matrix and the second bond matrix is, accordingly, 70%.

In an embodiment, an elemental weight percent difference between the composition of the first bond matrix and the second bond matrix may be not greater than about 99%, such as not greater than 90%, or not greater than 85%, not greater than 80%, not greater than 75%, or not greater than 70%. In another embodiment, the core drill bit can include an elemental weight percent difference between the compositions of the first bond matrix and the second bond matrix of at least about 1%, such as at least 2%, at least 3%, at least 5%, at least 10%, at least 25%, or at least 35%. It is to be appreciated that an elemental weight percent difference between the compositions of the first bond matrix and the second bond matrix can be within a range including any of the minimum and maximum percentages disclosed herein. For instance, an elemental weight percent difference between the compositions of the first bond matrix and the second bond matrix can be within a range including at least 1% and not greater than 99%.

In an embodiment, the first region can have a first hardness $RH_1$ and the second region can have a second hardness $RH_2$. The second hardness $RH_2$ can be different from the first hardness $RH_1$. Particularly, the first hardness $RH_1$ can be greater than the second hardness $RH_2$. As disclosed herein, the first and second hardness can be measured in accordance with Rockwell hardness scale B, using a load of 100 kgf with a steel sphere indenter having a diameter of 1/16 inches (1.588 mm). In some instances, the first hardness $RH_1$ can be at least 101 HRB, such as at least 102 HRB. In other instances, $RH_1$ can be at most 110 HRB, such as at most 107 HRB or at most 105 HRB. It is to be understood that $RH_1$ can be in a range including any of the minimum and maximum values disclosed herein. For example, $RH_1$ can be within a range including at least 101 HRB and at most 110 HRB. In another embodiment, $RH_2$ can be at least 95 HRB, such as at least 97 HRB or at least 98 HRB. In a further embodiment, $RH_2$ may be not greater than 101 HRB, such as not greater than 99 HRB. It is to be understood that $RH_2$ can be in a range including any of the minimum and maximum values disclosed herein. For example, $RH_2$ can be within a range including at least 97 HRB and at most 101 HRB.

In some instances, $RH_1$ and $RH_2$ can be measured in accordance with the Vickers hardness test, using a load of 200 g with a pyramidal diamond indenter. Accordingly, in some embodiments, $RH_1$ can have a Vickers hardness of at least 260 GPa, such as at least 265 GPa, at least 269 GPa, at least 271 GPa, or at least 273 GPa. In some other embodiments, $RH_1$ can have a Vickers hardness of at most 298 GPa, such as at most 295 GPa, at most 292 GPa, or at most 286 GPa, or at most 284 GPa. It is to be understood that $RH_1$ can have a Vickers hardness in a range including any of the minimum and maximum values disclosed herein. For example, $RH_1$ can be within a range including at least 260 GPa and at most 298 GPa.

In some embodiments, $RH_2$ can have a Vickers hardness of at least 210 GPa, such as at least 215 GPa, at least 218 GPa, at least 221 GPa, at least 225 GPa, at least 228 GPa, or at least 232 GPa. In some other embodiments, $RH_2$ can have a Vickers hardness of at most 268 GPa, such as at most 265 GPa, at most 262 GPa, or at most 260 GPa, at most 258 GPa or at most 256 GPa. It is to be understood that $RH_2$ can have a Vickers hardness in a range including any of the minimum and maximum values disclosed herein. For example, $RH_2$ can be within a range including at least 210 GPa and at most 268 GPa. After reading this disclosure, a skilled artisan would understand the first and second hardness can be measured by Rockwell hardness scale B or Vickers hardness, as desired or suitable to a particular application.

In an embodiment, the second region can include abrasive particles including the same or a different material, as compared to the first region. For instance, the second region can include abrasive particles including a superabrasive material. An exemplary superabrasive material can include diamond, cubic boron nitride (cBN), or any combination thereof. In a particular embodiment, the superabrasive material can consist of diamond, cubic boron nitride (cBN), or any combination thereof. In an embodiment, the second region can include abrasive particles having an average particle size of at least 30 microns, such as at least 35 microns, at least 40 microns, at least 45 microns, at least 50 microns, at least 55 microns, at least 60 microns, at least 70 microns, at least 80 microns, at least 85 microns, at least 95 microns, at least 100 microns, at least 125 microns, or at least 140 microns. In another embodiment, the abrasive particles can have an average particle size of at most 150 microns, such as at most 145 microns, at most 120 microns, at most 110 microns, at most 105 microns, at most 100 microns, at most 95 microns, at most 90 microns, at most 85 microns, at most 80 microns, at most 75 microns, at most 70 microns, at most 65 microns, at most 60 microns, at most 50 microns, at most 45 microns, at most 40 microns It is to be appreciated that the abrasive particles in the second region can have an average particle size within a range including any of the minimum and maximum values disclosed herein. For instance, the average particle size of the abrasive particles within the second region can be within a range including at least 30 microns and at most 150 microns.

In a further embodiment, the second region can include a particular abrasive particle concentration that can facilitate improved formation, properties and/or operation of the core drill bit. For example, the second region can include an abrasive particle concentration of at least about 1% for a total weight of the second region, such as at least about 2%, at least about 4%, at least about 5%, at least 7%, at least 9%, or at least 10%. In a further embodiment, the second region may include an abrasive particle concentration of not greater than about 15% for a total weigh of the second region, such as not greater than about 13%, not greater than 11%, not greater than about 9%, not greater than about 8%, not greater than about 6%, not greater than about 4%. It is to be understood that the second region can include an abrasive particle concentration within a range including any of the minimum and maximum percentages noted herein. For instance, the second region can include an abrasive particle concentration within a range including at least 1% and not greater than 15% for a total weight of the second region.

In an embodiment, the second region can have a particular porosity that can facilitate improved formation, properties, and/or operation of the core drill bit. The porosity of the second region may be the same as or different than that of the first region. In an embodiment, the second region can have a porosity of at least 0.1 vol % for a total volume of the second region, such as at least 0.3 vol %, at least 0.5 vol %, at least 0.9 vol %, or at least 1.5 vol % for a total volume of the second region. In another embodiment, the first region may have a porosity of not greater than 10 vol % for a total volume of the second region, such as not greater than 9 vol %, or not greater than 8 vol %. It is to be understood that the second region can include a porosity within a range including any of the minimum and maximum percentages disclosed herein. For instance the second region can have a porosity within a range including at least 0.1 vol % and not greater than 10 vol % for a total volume of the second region.

In an embodiment, the abrasive tip can define an exterior surface region of the core drill bit. In a material removal operation, the exterior surface region of the core drill bit can be in contact with the workpiece. In another embodiment, the abrasive tip can consist of the first and second regions. In a further embodiment, the first and the second regions can define an exterior surface region of the drill bit, and more particularly both the first and second regions can define different exterior surface regions of the body of the core drill bit. The first and second regions can define exterior surface of the body of the abrasive tip and are configured to contact a workpiece during a material removal operation.

As illustrated in FIG. 1, a longitudinal axis 150 extends along and defines a length, L, of the core drill bit 100. The core drill bit 100 can include a central opening 106 extending in the direction of the longitudinal axis 150. As illustrated, the opening 106 can extend through the first region 101, the second region 102, and the body 120. The opening 106 can further extend through the shaft 130 (not illustrated) to allow coolant to flow through the drill bit in operations.

As illustrated in FIG. 1, the first region can define a ring-shaped element. Accordingly, the first region can have an annular cross-section about the longitudinal axis 150. In another embodiment, the second region 102 can have an annular cross-section about the longitudinal axis 150. In a particular embodiment, both the first and second regions can have an annular cross-section about the longitudinal axis 150.

FIG. 2 includes an illustration of an annular cross-sectional view of the first region 101 of the core drill bit 100. The opening 106 is at the center of the first region 101. The first region can have a first inner diameter $d_{in1}$ and an outer diameter $d_o$. The first inner diameter ($d_{in1}$) can be substantially uniform through a thickness of the first region that extends in the direction of the longitudinal axis 150. The outer diameter ($d_o$) can also be substantially uniform through the thickness of the first region. As used herein, the term, substantially uniform, is intended to mean for a set circumference $C_0$, a diameter has a maximum deviation of ±20% of the theoretical diameter $D_0$ for the circumference $C_0$ ($C_0 = \pi \times D_0$).

In an embodiment, the first inner diameter ($d_{in1}$) can be at least 3.2 mm, such as at least 5 mm, at least 7.5 mm, at least 10 mm, or at least 15 mm. In another embodiment, the first inner diameter may not be greater than 123.2 mm, such as not greater than 115 mm, not greater than 105 mm, not greater than 95 mm, not greater than 80 mm, or not greater than 75 mm. It is to be appreciated that the first inner diameter can be within a range including any of the minimum and maximum values noted herein. For example, the first inner diameter can be within a range including at least 2.2 mm and not greater than 123.2 mm.

In an embodiment, the first region can have an outer diameter ($d_o$) of at least 5 mm, such as at least 6.5 mm, at least 8 mm, at least 10 mm, at least 15 mm, or at least 18 mm. In another embodiment, the first region may have an outer diameter of not greater than 125 mm, such as, not greater than 120 mm, not greater than 115 mm, not greater than 110 mm, not greater than 105 mm, not greater than 90 mm, not greater than 80 mm, not greater than 75 mm, not greater than 65 mm, not greater than 60, not greater than 55 mm. It is to be appreciated that the first region can have an outer diameter within a range including any of the minimum and maximum values noted herein. For example, the first region can have an outer diameter within a range including at least 5 mm and not greater than 125 mm.

In an embodiment, the first region can be bonded to the second region. In a further embodiment, the first region and the second region can be bonded by co-sintering and interdiffusion of the first bond matrix and the second bond matrix. In another embodiment, the core drill bit can include a joint region connecting the first region and the second region. For instance, the joint region can include a bond matrix including a mixture of the first bond matrix and the second bond matrix. In one embodiment, the joint region can include abrasive particles, such as those from the first region, the second region, or both.

In a further embodiment, the joint region can include an interfacial layer. The interfacial layer can define a region of bond matrix material having element from both the first and second bond matrix materials. The interfacial layer can define a co-sintered boundary between the first and second regions. In at least one embodiment, the interfacial layer can define a region of interdiffusion of elements from the first and second bond matrix materials.

The interfacial layer may have a particular thickness that can facilitate improved formation, properties and/or operation of the core drill bit. For example, the interfacial layer can have a thickness of at least 2 microns, such as at least 4 microns, at least 6 microns, at least 9 microns, at least 11 microns, at least 13 microns, at least 15 microns, at least 18 microns, or at least 20 microns. In another instance, the interfacial layer can have a thickness of at most 35 microns, such as at most 32 microns, at most 30 microns, at most 28 microns, at most 25 microns, at most 23 microns, or at most 20 microns. It is to be understood that the interfacial layer can have a thickness in a range including any of the minimum and maximum values noted herein. For example, the interfacial layer can include a thickness in a range including at least 2 microns and at most 35 microns, such as in a range including at least 11 microns at most 28 microns or in a range including at least 15 microns and at most 25 microns.

In an embodiment, the core drill bit can include an elemental weight percent difference between the compositions of the first bond matrix and the interfacial layer. An elemental weight percent difference is the absolute value of the difference in weight concentration of each element contained in the first bond matrix relative to the interfacial layer.

In an embodiment, an elemental weight percent difference between the compositions of the first bond matrix and the interfacial layer may be not greater than 70%, such as not greater than 60%. In an embodiment, an elemental weight percent difference between the compositions of the first bond matrix and the interfacial layer can be at least 0.2%, such as at least 0.5%, at least 1%. It is to be appreciated that an elemental weight percent difference between the compositions of the first bond matrix and the interfacial layer can be within a range including any of the minimum and maximum percentages disclosed herein. For instance, an elemental weight percent difference between the compositions of the first bond matrix and the interfacial layer can be within a range including at least 0.2% and not greater than 60%.

In an embodiment, the core drill bit can include an elemental weight percent difference between the compositions of the second bond matrix and the interfacial layer. An elemental weight percent difference is the absolute value of the difference in weight concentration of each element contained in the second bond matrix relative to the interfacial layer.

In an embodiment, an elemental weight percent difference between the compositions of the second bond matrix and the interfacial layer may be not greater than about 60%, such as not greater than 55%. In an embodiment, an elemental weight percent difference between the compositions of the second bond matrix and the interfacial layer can be at least 0.2%, such as at least 0.5%, at least 1%, at least 5%, or at least 10%. It is to be appreciated that an elemental weight percent difference between the compositions of the second bond matrix and the interfacial layer can be within a range including any of the minimum and maximum percentages disclosed herein. For instance, an elemental weight percent difference between the compositions of the second bond matrix and the interfacial layer can be within a range including at least 0.2% and not greater than 60%.

In an embodiment, the first region can include a hollow core cutting element. The hollow core cutting element can include abrasive grains within a bond matrix. In a particular embodiment, the first region can define a hollow core cutting element. In a further embodiment, the hollow core cutting element can be ring-shaped.

In another embodiment, the second region can include a seamer element, which can be connected to the core cutting element. In a particular embodiment, the second region can define a seamer element. The seamer element can include abrasive grains within a bond matrix. In an embodiment, the seamer element and the core cutting element can include the same or different compositions. For instance, the seamer element and the core cutting element can include different compositions. In a particular embodiment, the matrices of the core cutting element and the seamer element can include different compositions.

Referring to FIG. 3, an annular cross-sectional view of the second region 102 of the core drill bit 100 is included. The opening 106 can be at the center of the second region and have an inner diameter $d_{in2}$. $D_{in2}$ can be the same as $d_{in1}$. In certain designs, $d_{in2}$ of the second region can be different compared to $d_{in1}$ of the first region.

In an embodiment, the second inner diameter ($d_{in2}$) can be at least 3.2 mm, such as at least 3.5 mm, at least 4.5 mm, at least 5.5 mm, or at least 7 mm. In another embodiment, the second inner diameter may not be greater than 123.2 mm, such as not greater than 115 mm, not greater than 105 mm, not greater than 95 mm, or not greater than 90 mm. It is to be appreciated that the second inner diameter can be within a range including any of the minimum and maximum values noted herein. For example, the second inner diameter can be within a range including at least 3.2 mm and not greater than 123.2 mm.

Figure 6:
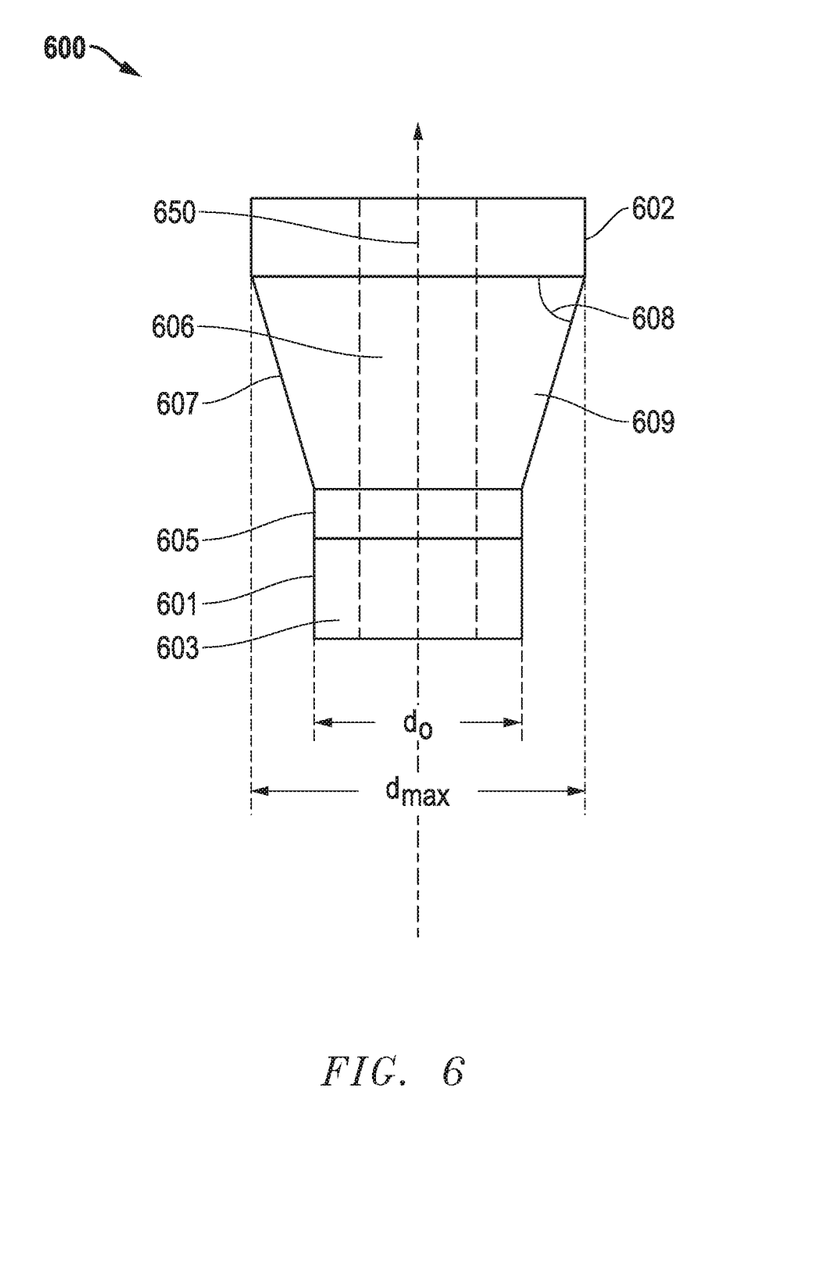
FIG. 6 includes an illustration of an enlarged side view of a portion of a drill bit in accordance with an embodiment.

FIG. 6 includes an enlarged illustration of a side view of a portion of a core drill bit 600. The core drill bit 600 can include a first region 601, a joint region 605, and a second region 602. A central opening 606 can extend through the first region 601 and second region 602 in the direction of the longitudinal axis 650. In an embodiment, the joint region 605 can have an annular cross-sectional view about the longitudinal axis 650.

The first region 601 can include a hollow core cutting element 603, and the second region can include a seamer 609. The seamer can include a chamfer 607 and a seamer angle 608. In an embodiment, the seam angle can be at least 45 degrees, at least 46 degrees, at least 47 degrees or at least 48 degrees. In another embodiment, the seamer angle may be not greater than 55 degrees, not greater than 53 degrees, not greater than 52 degrees, or not greater than 51 degrees. In a further embodiment, the seamer angle can be within a range including any of the minimum and maximum values disclosed herein. For instance, the seamer angle can be within a range including at least 45 degrees and not greater than 55 degrees.

The second region can have a maximum outer diameter, $d_{max}$. The maximum outer diameter of the second region $d_{max}$ can be greater than the outer diameter $d_o$ of the first region. In an embodiment, the maximum outer diameter ($d_{max}$) can be at least 2 mm greater than the outer diameter of the first region ($d_o$), such as at least 3 mm greater than $d_o$, at least 4 mm greater than $d_o$, or at least 6 mm greater than $d_o$.

In an embodiment, the second region can have a maximum outer diameter $d_{max}$ of at least about 7 mm, such as, at least about 9 mm, at least 10.5 mm, at least 12 mm, or at least 16 mm. In another embodiment, the second region may have a maximum outer diameter $d_{max}$ of not greater than 250 mm, such as not greater than 230 mm, not greater than 210 mm, not greater than 200 mm, or not greater than 180 mm. It is to be appreciated that the maximum outer diameter $d_{max}$ of the second region can be within a range including any of the minimum and maximum values noted herein. For instance, the maximum outer diameter $d_{max}$ can be within a range including at least 7 mm and not greater than 250 mm. In some applications, the maximum outer diameter ($d_{max}$) of the second region can be different than the values or ranges noted herein, and formed as desired by any particular application.

The core drill bit can have an improved service life. In an embodiment, the core drill bit can be expected to form more holes in its service life in the same drilling condition and glass workpieces, as compared to a conventional core drill bit. For instance, the core drill bit can form at least 3200 holes in drilling conditions that a core drill bit is normally expected to operate in, such as at least 4000 holes, at least 5000 holes, at least 5500 holes, or at least 6000 holes. In another embodiment, the core drill bit may not form more than 10000 holes.

In a further embodiment, the core drill bit can include a certain wear rating. As disclosed herein, the wear rating is measured using the conditions disclosed herein. The workpiece is a piece of glass having thickness of 4 mm. A pair of two drill bits is used with a TAC drilling machine and to form 480 holes having the diameter of 11.5 mm. A drill bit is used to drill from the bottom of the glass and through half of the thickness of the glass. The other is then used to drill from the top and open the hole. For each drilling, the drill bit is operated at a speed of 6000 rpm. The first region has a feed speed of 80 mm/min, and the second region has a feed speed of 40 mm/min. After forming 480 holes, the worn off length of the bottom core drill bit is measured as wear rating. In an embodiment, the core drill bit can include a wear rating of not greater than about 0.09 mm, such as, not greater than about 0.085 mm, not greater than about 0.08 mm, not greater than about 0.075 mm, not greater than about 0.07 mm, not greater than about 0.065 mm, or not greater than about 0.06 mm. In another embodiment, the core drill bit can include a wear rating greater than 0. A skilled artisan would understand that in different drilling conditions, the wear rating of a core drill bit can change.

Figure 7:
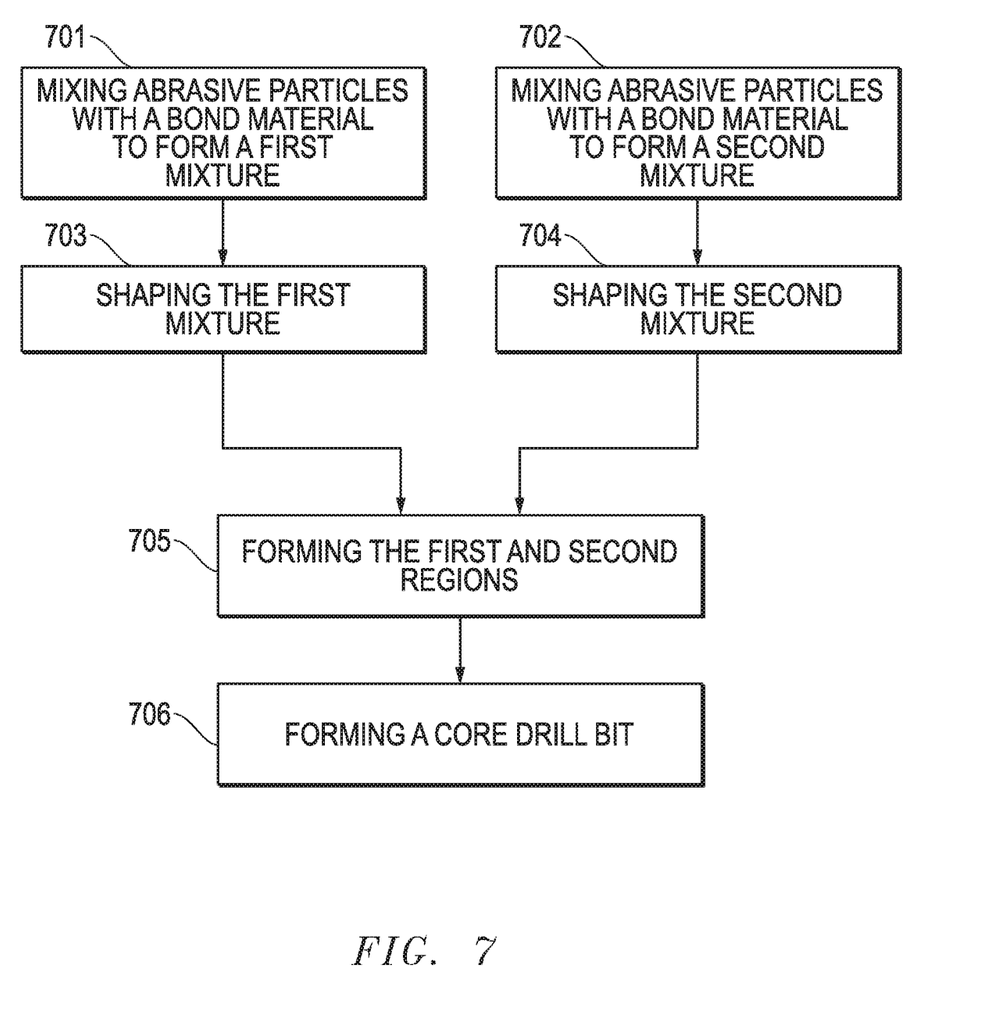
FIG. 7 includes a flowchart illustrating a process in accordance with an embodiment.

FIG. 7 includes a flowchart illustrating a process of forming a core drill bit in accordance with embodiments herein. As illustrated, the process can start at step 701 to form a first mixture including abrasive particles and a first bond matrix material. The first bond matrix material can form the first bond matrix in a finally formed core drill bit. At step 702, a second mixture can be formed including abrasive particles and a second bond matrix material. The second bond matrix material can form the second bond matrix in a finally formed core drill bit.

At step 703, the first mixture can be treated to form a desired shape. For instance the first mixture can be placed in a suitable shaping apparatus, such as a mold with desired dimensions. In an embodiment, a first portion of the first mixture can be placed in a shaping apparatus. The first portion can be placed at the bottom of the shaping apparatus. In another embodiment, a first portion can include a majority of the first mixture. In a further embodiment, the first portion may include not greater than 95 vol %, such as not greater than 80 vol %, or not greater than 75 vol % of the first mixture. In another embodiment, at least 50 vol % to not greater than 95 vol % of the first mixture can be placed in the bottom of a shaping apparatus. The first portion can be optionally compacted to have a suitable porosity or density.

Prior to step 704, the rest portion of the first mixture can be placed on top of the first portion, which can be followed by adding the second mixture to the top of the rest portion of the first mixture, as illustrated at step 705 of FIG. 7. At step 706, the first and second mixtures can be further treated, such as with compacting, pressing and heating. In another embodiment, the first and second mixtures can be treated such that the first and second bond matrix materials can infiltrate into the other region to form the joint region. In another embodiment, the stacked mixtures can be pressed using cold isostatic pressing, hot pressing, or hot isostatic pressing. In a particular embodiment, the mixtures can be sintered to form the first the region connected to the second region. In an embodiment, sintering can be performed at a temperature sufficient to allow the first bond matrix and second bond matrix to form. For instance, sintering can be performed at a temperature of at least 800° C. and not greater than 1000° C. A pressure from 1000 psi to 3000 psi can be applied. In a further embodiment, sintering can be performed for at least 30 minutes to not greater than 4 hours.

Figure 8:
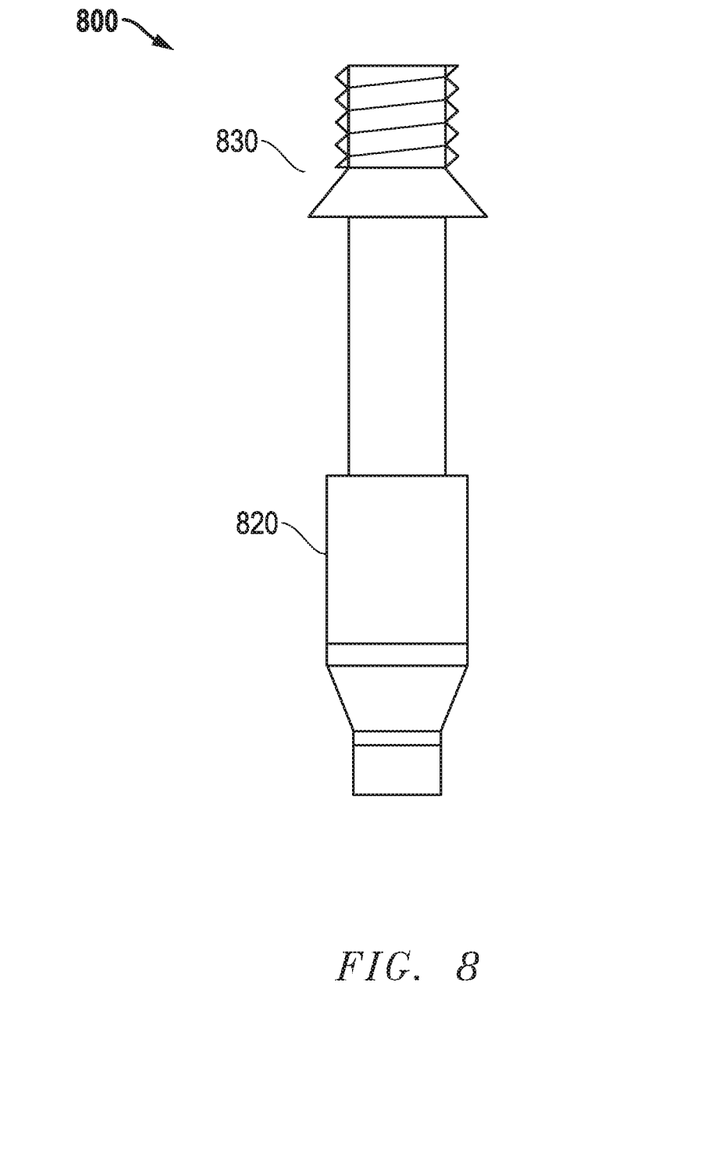
FIG. 8 includes an illustration of a side view of a drill bit in accordance with an embodiment.

The sintered first and second regions can be connected to a core drill bit body, such as, the body 120 in FIG. 1, by brazing or sintering such that the body is bonded to the second region. A shaft can be screwed to the body or bonded to the body by brazing. The body and the shaft can be formed by methods known in the art, such as machining. The shaft may have the shape as illustrated in FIG. 1 or any shape or geometry to adapt to drilling machines used in the art, such as the shaft 830 of the core drill bit 800 illustrated in FIG. 8. One end of the shaft 830 is connected to the body 820. Alternatively, the body and the shaft can be formed as a single piece and connected to the second region by brazing.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below.

EMBODIMENTS

Embodiment 1

A core drill bit comprising an abrasive tip and a drill body, wherein the abrasive tip comprises a first region and a second region, wherein the first region comprises abrasive grains within a first bond matrix, wherein the second region comprises abrasive grains within a second bond matrix and wherein a composition of the first bond matrix is different from a composition of the second bond matrix.

Embodiment 2

A core drill bit comprising:
a longitudinal axis running the length of the drill bit;
a first region comprising abrasive grains within a first bond matrix; and
a second region comprising abrasive grains within a second bond matrix,
wherein the first region comprises an annular cross-section about the longitudinal axis of the drill bit, wherein the second region comprises an annular cross about the longitudinal axis of the drill bit, and wherein a composition of the first bond matrix is different from a composition of the second bond matrix.

Embodiment 3

A core drill bit comprising:
a hollow core cutting element comprising abrasive grains within a first bond matrix;
a seamer element connected to the core cutting element and comprising abrasive grains within a second bond matrix;
wherein a composition of the first bond matrix is different from a composition of the second bond matrix.

Embodiment 4

The core drill bit of any one of embodiments 1 or 2, wherein the first region has a first hardness RH1 and the second region has a second hardness RH2 and wherein RH1 is different than RH2.

Embodiment 5

The core drill bit of embodiment 4, wherein RH1 is greater than RH2.

Embodiment 6

The core drill bit of any one of embodiments 1 and 2, wherein the first region defines a ring-shaped element.

Embodiment 7

The core drill bit of any one of embodiments 1 and 2, wherein the first region defines a hollow core cutting element.

Embodiment 8

The core drill bit of any one of embodiments 6 and 7, wherein the first region has an outer diameter and an inner diameter.

Embodiment 9

The core drill bit of embodiment 8, wherein the first region has a uniform outer diameter.

Embodiment 10

The core drill bit of embodiment 8, wherein the first region has a uniform inner diameter.

Embodiment 11

The core drill bit of any one of embodiments 8 and 9, wherein the outer diameter of the first region is at least at least 5 mm, at least 6.5 mm, or at least 8 mm.

Embodiment 12

The core drill bit of any one of embodiments 8 and 9, wherein the outer diameter of the first region is not greater than 125, not greater than 120 mm, or not greater than 115 mm.

Embodiment 13

The core drill bit of any one of embodiments 8 and 9, wherein the inner diameter of the first region is at least 3.2 mm, at least 5 mm, at least 7.5 mm, or at least 10 mm.

Embodiment 14

The core drill bit of any one of embodiments 8 and 9, wherein the inner diameter of the first region is not greater than 123.2 mm, not greater than 115 mm, not greater than 105 mm, not greater than 95 mm, or not greater than 80 mm.

Embodiment 15

The core drill bit of any one of embodiments 1 and 2, wherein the second region comprises a seamer element.

Embodiment 16

The core drill bit of any one of embodiments 1 and 2, wherein the second region comprises a chamfer.

Embodiment 17

The core drill bit of any one of embodiments 8, 15 and 16, wherein the second region has a maximum outer diameter and wherein the maximum outer diameter of the second region is greater than the outer diameter of the first region.

Embodiment 18

The core drill bit of embodiment 17, wherein the maximum outer diameter of the second region is at least 7 mm, at least 9 mm, at least 10.5 mm, or at least 12 mm.

Embodiment 19

The core drill bit of embodiment 17, wherein the maximum outer diameter of the second region is not greater than not greater than 250 mm, not greater than 230 mm, not greater than 210 mm, or not greater than 200 mm.

Embodiment 20

The core drill bit of any one of embodiments 1 and 2, wherein the first region is bonded to the second region.

Embodiment 21

The core drill bit of any one of embodiments 1 and 2, wherein the glass core drill bit further comprises a joint region connecting the first region and the second region.

Embodiment 22

The core drill bit of embodiment 21, wherein the joint region comprises a mixture of the first bond matrix and the second bond matrix.

Embodiment 23

The core drill bit of embodiment 22, wherein the joint region comprises an interfacial layer.

Embodiment 24

The core drill bit of embodiment 23, wherein the interfacial layer comprises a distinct phase from both the first region and the second region.

Embodiment 25

The core drill bit of embodiment 23, wherein the core drill bit comprises an elemental weight percent difference between the composition of the first bond matrix and the second bond matrix of not greater than about 99%, not greater than 90%, not greater than 85%, not greater than 80%, not greater than 75% or not greater than 70%.

Embodiment 26

The core drill bit of embodiment 25, wherein the core drill bit comprises an elemental weight percent difference between the compositions of the first bond matrix and the second bond matrix of at least 1 weight percent.

Embodiment 27

The core drill bit of embodiment 25, the core drill bit comprises an elemental weight percent difference between the compositions of the first bond matrix and the interfacial layer of not greater than about 60 weight percent.

Embodiment 28

The core drill bit of embodiment 25, the core drill bit comprises an elemental weight percent difference between the compositions of the first bond matrix and the interfacial layer of at least about 0.2 weight percent.

Embodiment 29

The core drill bit of any one of the previous embodiments, wherein the core drill bit comprises at least one annular cross-section about a longitudinal axis of the drill bit.

Embodiment 30

The core drill bit of any one of the previous embodiments, wherein the first region comprises an annular cross-section about a longitudinal axis of the drill bit.

Embodiment 31

The core drill bit of any one of the previous embodiments, wherein the second region comprises an annular cross-section about a longitudinal axis of the drill bit.

Embodiment 32

The core drill bit of any one of the previous embodiments, wherein the joint region comprises an annular cross-section about a longitudinal axis of the drill bit.

Embodiment 33

The core drill bit of any one of the previous embodiments, wherein the first bond matrix comprises a cobalt containing material.

Embodiment 34

The core drill bit of any one of the previous embodiments, wherein the first bond matrix consists of a cobalt containing material.

Embodiment 35

The core drill bit of any one of the previous embodiments, wherein the first bond matrix comprises an alloy including Co.

Embodiment 36

The core drill bit of any one of the previous embodiments, wherein the first bond matrix includes Co, Fe, Cu, or any combination thereof.

Embodiment 37

The core drill bit of any one of the previous embodiments, wherein the second bond matrix comprises Co and Sn.

Embodiment 38

The core drill bit of embodiment 37, wherein the second bond matrix comprises at least about 1% Sn for a total weight of the second bond matrix.

Embodiment 39

The core drill bit of embodiment 4, wherein RH1 is at least about 101 HRB.

Embodiment 40

The core drill bit of embodiment 4, wherein RH2 is not greater than 101 HRB.

Embodiment 41

The core drill bit of any one of the previous embodiments, wherein the abrasive particles comprise a superabrasive material.

Embodiment 42

The core drill bit of embodiment 41, wherein the superabrasive material comprises diamond, cubic boron nitride (cBN), or any combination thereof.

Embodiment 43

The core drill bit of embodiment 41, wherein the superabrasive material consists of diamond, cubic boron nitride (cBN), or any combination thereof.

Embodiment 44

The core drill bit of any one of the previous embodiments, wherein the abrasive particles have an average particle size of at least 30 microns and not greater than 150 microns.

Embodiment 45

The core drill bit of any one of embodiments 1 and 2, wherein the first region comprises an abrasive particle concentration of at least about 1% for a total weigh of the first region, at least about 3%, at least about 4% and at least about 5%.

Embodiment 46

The core drill bit of any one of embodiments 1 and 2, wherein the first region comprises an abrasive particle concentration of not greater than about 20% for a total weigh of the first region, not greater than about 15%, not greater than about 10% and not greater than about 8%.

Embodiment 47

The core drill bit of any one of embodiments 1 and 2, wherein the second region comprises an abrasive particle concentration of at least about 1% for a total weigh of the second region, at least about 3%, at least about 4% and at least about 5%.

Embodiment 48

The core drill bit of any one of embodiments 1 and 2, wherein the second region comprises an abrasive particle concentration of not greater than about 20% for a total weigh of the second region, not greater than about 15%, not greater than about 10% and not greater than about 8%.

Embodiment 49

The core drill bit of any one of embodiments 1 and 2, wherein the first region comprises a first bond matrix concentration of at least 90%, at least 92%, at least 95%, or at least 98%.

Embodiment 50

The core drill bit of any one of embodiments 1 and 2, wherein the first region comprises a first bond matrix concentration of not greater than 99% for a total weight of the first region, such as not greater than 98% or not greater than 97%.

Embodiment 51

The core drill bit of any one of embodiments 1 and 2, wherein the second region comprises a second bond matrix concentration of at least 90%, at least 92%, at least 93%, or at least 94%.

Embodiment 52

The core drill bit of any one of embodiments 1 and 2, wherein the second region comprises a second bond matrix concentration of not greater than 99% for a total weight of the first region, such as not greater than 98% or not greater than 97%.

Embodiment 53

The core drill bit of any one of embodiments 1 and 2, wherein the first region comprises a porosity of at least 0.2 vol %, at least 0.3 vol %, at least 0.4 vol %, at least 0.5 vol %, at least 0.8 vol %, or at least 1 vol %.

Embodiment 54

The core drill bit of any one of embodiments 1 and 2, wherein the first region comprises a porosity of not greater than 5 vol % for a total volume of the first region, such as not greater than 4 vol %, or not greater than 3 vol %.

Embodiment 55

The core drill bit of any one of embodiments 1 and 2, wherein the second region comprises a porosity of at least about 0.1 vol %, at least 0.5 vol %, at least 1 vol %, at least 2 vol %, at least 3 vol %, or at least 4 vol %

Embodiment 56

The core drill bit of any one of embodiments 1 and 2, wherein the second region comprises a porosity of not greater than 10 vol % for a total volume of the first region, such as not greater than 9 vol %, or not greater than 8 vol %.

Embodiment 57

The core drill bit of any one of embodiments 1 to 3, further comprising a seam angle of at least 45 degrees, such as at least 46 degrees, at least 47 degrees or at least 48 degrees.

Embodiment 58

The core drill bit of any one of embodiments 1 to 3, further comprising a seamer angle of not greater than 55 degrees, such as not greater than 53 degrees, not greater than 52 degrees, or not greater than 51 degrees.

Embodiment 59

The core drill bit of any one of the preceding embodiments, wherein the abrasive tip comprises a beveled edge.

EXAMPLES

Example 1

Sets of conventional core drill bits, CON1, and Sample A representative of an embodiment, and additional samples, Sample B, were formed. For each sample, the length of the drill and the shaft was 75 mm and 55 mm, respectively. The cutting tip portion for each sample had a thickness of 2 mm, an outer diameter of 11.5 mm, and inner diameter of 9.7 mm. The seamer portion for each sample had an outer diameter of 15.5 mm, and inner diameter of 9.7 mm. The concentrations of the components in the bond matrices are included in Table 1. Each sample included 6% of diamond abrasive particles in the cutting tip and seamer.

TABLE 1

|  | Cutting Tip (%) | Seamer | Wear (mm) | Maxing chipping (mm) |
|---|---|---|---|---|
| CON1 | Co/Sn: 97/3 | Co/Sn: 97/3 | 0.10 ± 0.02 | 0.4 ± 0.03 |
| Sample A | Co/Fe/Cu: 27/66/7 | Co/Sn: 97/3 | 0.05 ± 0.01 | 0.38 ± 0.04 |
| Sample B | Co/Cu/Sn: 10/75/15 | Co/Cu/Ag: 50/30/20 | 0.14 ± 0.01 | 0.55 ± 0.04 |

Wear rating of the samples were tested with a TAC drilling machine in a glass substrate having the thickness of 4 mm. A pair of two same drill bit samples was used in the test and the wearing rate of the bottom drill bit was measured and also included in Table 1. For each of the samples, the difference between the original drill bit length prior to drilling and the length after forming 480 holes having the diameter of 11.5 mm was used as wearing rate. The same drilling conditions were used for each pair of samples and the bottom and top drill bits of each pair. The drilling was operated at a rotation speed of 6000 rpm, and the feed speed for cutting tips were 80 mm/min for DD (tip) and 40 mm/min for seamer. Drill bits were dressed every 30 holes. As disclosed in Table 1, the average wear rating of Sample A was significantly improved over CON1 samples and better than Sample B, while the maximum chipping of Sample A and CON 1 was both considered low and better than Sample B.

Example 2

Additional Sample 1 samples were tested on glass having the thickness of 3.2 mm for wearing rate. Glass was prepared and placed on a drilling station. A bottom drill bit sample was moved close to the glass to drill through about half of the thickness of the glass and then brought back to the initial place. A top drill bit sample was brought close to the glass to drill through the other half of the thickness to form a hole, and then moved back to the initial place. The drilling operation was repeated to form 900 holes having a diameter of 11.5 mm. The bottom and top drill bit samples had a rotation speed of 2730 rpm. The feed speed for cutting tips was 100 mm/min and 90 mm/min for seamers. The wear rating of the bottom drill bit was 0.081 mm after formation of 900 holes. Using the same or similar testing conditions, Sample 1 can be expected to have wear rating less than 0.1 mm for forming 1000 holes.

The present embodiments represent a departure from the state of the art. Notably, embodiments herein are related to a core drill bit, particularly a glass core drill bit, with improved service life and reduced chipping areas. Not wishing to be bound by any theory, the combination of the first portion and the second portion helps to improve wear rating of the core drill bit and control of formation of chipped areas around edges of drilled holes.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive. Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A core drill bit comprising:
an abrasive tip and a drill body, wherein the abrasive tip comprises a first region and a second region; and
a central opening extending through the first region, the second region, and the body,
wherein the first region comprises abrasive grains within a first bond matrix and a first bond matrix concentration of at least 90% and not greater than 99% for a total weight of the first region, wherein the second region comprises abrasive grains within a second bond matrix, and wherein a composition of the first bond matrix is different from a composition of the second bond matrix.

2. The core drill bit of claim 1, further comprising a longitudinal axis running a length of the core drill bit, wherein the abrasive tip is attached to the drill body in a direction of the longitudinal axis, and wherein the first region is bonded to the second region in the direction of the longitudinal axis.

3. The core drill bit of claim 1, wherein the first region has a first hardness $RH_1$ and the second region has a second hardness $RH_2$ and wherein $RH_1$ is different than $RH_2$.

4. The core drill bit of claim 3, wherein $RH_1$ is greater than $RH_2$.

5. The core drill bit of claim 1, wherein the first bond matrix comprises a Fe-containing material, an alloy including Co, or a combination thereof.

6. The core drill bit of claim 1, wherein the first bond matrix comprises Co, Fe, and Cu.

7. The core drill bit of claim 1, wherein the second bond matrix comprises Co, Sn, or combination thereof.

8. The core drill bit of claim 1, wherein the first region comprises a beveled edge at an end distal from the second region.

9. The core drill bit of claim 1, further comprising an elemental weight percent difference between a composition of the first bond matrix and a composition of the second bond matrix of not greater than 90%.

10. A core drill bit comprising:
a longitudinal axis running a length of the drill bit;
a central opening;
a drill body;
a first region comprising abrasive grains within a first bond matrix; and
a second region comprising abrasive grains within a second bond matrix,
wherein the second region is disposed between the drill body and the first region in a direction of the longitudinal axis running the length of the drill bit;
wherein the first region comprises an annular cross-section about the longitudinal axis of the drill bit, wherein the second region comprises an annular cross-section about the longitudinal axis of the drill bit, and wherein a composition of the first bond matrix is different from a composition of the second bond matrix; and
wherein the central opening extends through the first region and the second region in a direction of the longitudinal axis.

11. The core drill bit of claim 10, wherein the first region is bonded to the second region, and wherein a maximum outer diameter of the second region is greater than an outer diameter of the first region.

12. The core drill bit of claim 11, wherein the second region comprises a chamfer.

13. The core drill bit of claim 10, wherein the first bond matrix comprises Co and Fe.

14. The core drill bit of claim 10, wherein the second bond matrix comprises Co and Sn.

15. The core drill bit of claim 10, wherein the abrasive grains of the first region comprise a superabrasive material.

16. The core drill bit of claim 10, wherein the first region comprises a concentration of Fe from about 10% to about 90% for a total weigh of the first bond material.

17. The core drill bit of claim 10, wherein the first region comprises a concentration of Co from about 5% to about 40% for a total weigh of the first bond material.

18. The core drill bit of claim 10, wherein the first region comprises a concentration of Cu from about 2% to about 60% for a total weigh of the first bond material.

19. The core drill bit of claim 10, wherein the first region comprises a first bond matrix concentration of at least 90% and not greater than 99% for a total weight of the first region.

* * * * *

UNITED STATES PATENT AND TRADEMARK OFFICE
CERTIFICATE OF CORRECTION

PATENT NO. : 10,723,041 B2  
APPLICATION NO. : 15/796372  
DATED : July 28, 2020  
INVENTOR(S) : Ji Wang Page 1 of 1

It is certified that error appears in the above-identified patent and that said Letters Patent is hereby corrected as shown below:

On the Title Page

Item (73), please delete "SAINT-GOBAIN ABRASIVES, INC./SAINT-GOBAIN ABRASIFS" and insert --SAINT-GOBAIN ABRASIVES, INC., Worcester, MA (US)/SAINT-GOBAIN ABRASIFS, Conflans-Sainte-Honorine (FR)--

Item (30), please delete "CHINA 201610971259" and insert --CHINA 201610971259.X--

In the Claims

Column 22, Line 43, please delete "total weigh of", and insert --total weight of--

Column 22, Line 46, please delete "total weigh of", and insert --total weight of--

Column 22, Line 49, please delete "total weigh of", and insert --total weight of--

Signed and Sealed this  
Fourth Day of October, 2022

Katherine Kelly Vidal  
*Director of the United States Patent and Trademark Office*